No. 784,682. PATENTED MAR. 14, 1905.
A. D. JONES.
ATTACHMENT FOR HAND AGRICULTURAL IMPLEMENTS.
APPLICATION FILED JUNE 27, 1904.

Witnesses

Inventor
Alva D. Jones.
By Attorneys
Parkinson & Richards

No. 784,682.

Patented March 14, 1905.

UNITED STATES PATENT OFFICE.

ALVA D. JONES, OF LOUISVILLE, KENTUCKY.

ATTACHMENT FOR HAND AGRICULTURAL IMPLEMENTS.

SPECIFICATION forming part of Letters Patent No. 784,682, dated March 14, 1905.

Application filed June 27, 1904. Serial No. 214,217.

*To all whom it may concern:*

Be it known that I, ALVA D. JONES, a citizen of the United States, residing at Louisville, in the county of Jefferson and State of Kentucky, have invented an Improved Attachment for Hand Agricultural Implements, of which the following is a specification.

The object of my invention is to provide an attachment for hand agricultural implements by the use of which fertilizers, seeds, &c., may be deposited in the soil at the will of the operator; and my invention consists in the combination and arrangement of parts hereinafter described and claimed.

Figure 1:
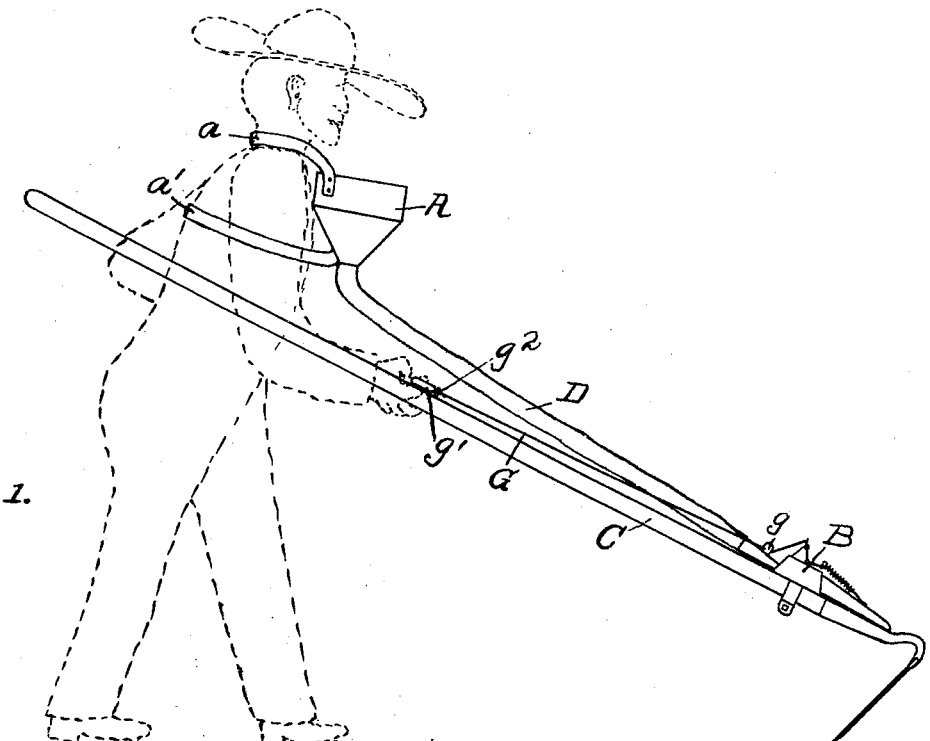
Figure 2:
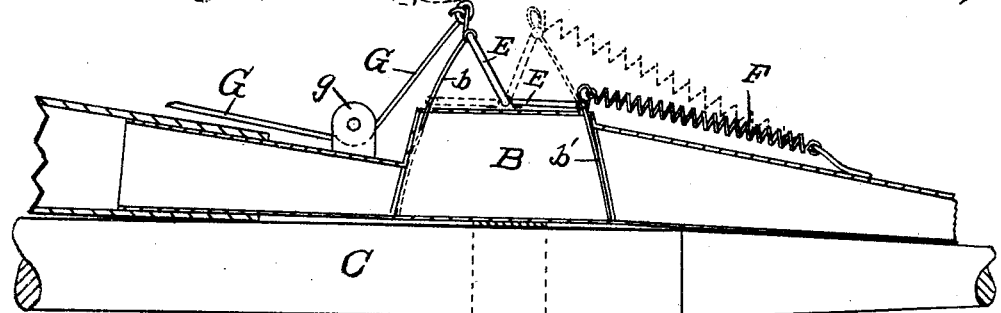
Figure 3:
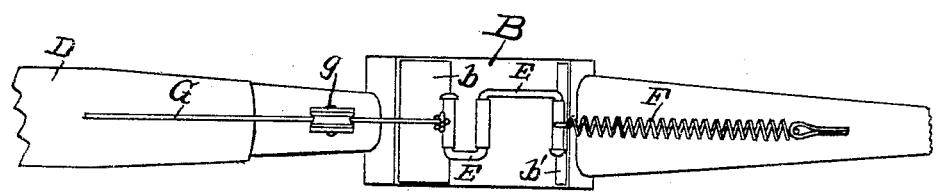

In the drawings, Figure 1 is a side elevation of an attachment embodying my invention shown as applied to an ordinary garden-hoe; Fig. 2, an enlarged section of the discharge mechanism, and Fig. 3 a top plan view corresponding to Fig. 2.

A reservoir A, adapted to contain the supply of fertilizer or seed, is carried by the operator by means of straps $a$ and $a'$ passing around the neck and body. The fertilizer or seed is carried to the discharge-box B on the implement C by the flexible hose D. At either end the discharge-box B is provided with sliding shutters $b$ and $b'$, adapted to close the upper and lower ends, respectively, of the box. The shutters $b$ and $b'$ are carried by an angular lever-arm E in such relation that when one shutter is in position to close its end of the box the other shutter is withdrawn, so as to leave its end of the box open. A spring F serves to hold the lower shutter $b'$ normally in closed position and the upper shutter $b$ in open position, as shown in full lines in Fig. 2. A cord G is attached to shutter $b$ and passing under pulley $g$ extends up the handle of the hoe to a convenient position for operation, where a ring $g'$ is provided for manipulation by the operator. An eyelet $g^2$ is secured to the hoe-handle and serves to guide the cord G and retain the ring $g'$ in its position.

In operation when it is desired to place a charge of fertilizer in the soil the operator pulls on cord G, and thus depresses shutter $b$ to cut off further supply from hose D. As shutter $b$ descends the angular lever E is operated to raise shutter $b'$ and discharge the contents of the box B onto the blade of the hoe and the ground thereabout. When the operator releases cord G, the spring F causes shutter $b'$ to descend to close the lower end of box B and shutter $b$ to ascend to open the upper end of the box to permit the box to again fill. This operation may be repeated and a box full of material discharged as desired by the operator.

By the use of this attachment seeds may be planted in any desired location or fertilizer may be applied to the soil either at planting time or during cultivation.

While I have shown the attachment and described its use with an ordinary garden-hoe, it is obvious that it may be applied to any hand agricultural implement.

I claim as my invention—

1. The combination of a reservoir adapted to be carried by the operator; a hand implement; a discharge-box on the implement; a flexible feed connection between the reservoir and discharge-box; shutters $b$ and $b'$ carried by lever E; spring F for normally holding shutter $b'$ in closed position and shutter $b$ in open position, and cord G for operating shutters $b$ and $b'$, substantially as specified.

2. The combination of reservoir A adapted to be carried by the operator; hand implement C; discharge-box B on implement C; flexible hose D connecting reservoir A and box B; shutters $b$ and $b'$ for discharging from box B; angular lever E connecting shutters $b$ and $b'$; spring F for normally holding shutter $b'$ in closed position; cord G connected with shutter $b$ and passing under pulley $g'$ and up the handle of the implement and ring $g^2$ for operating cord G, substantially as specified.

ALVA D. JONES.

Witnesses:
AGNES B. GRANT,
BRAYTON G. RICHARDS.